United States Patent [19]

Chion et al.

[11] 4,307,054

[45] Dec. 22, 1981

[54] PROCESS FOR THE PRODUCTION OF BI-COMPONENT YARNS

[75] Inventors: Pierre Chion, Bron; Robert Cuidard, Ecully; Jean Pommier, Sainte Foy les Lyon; Marc Tricot, Andilly, all of France

[73] Assignee: Rhone-Poulenc-Textile, Paris, France

[21] Appl. No.: 971,323

[22] Filed: Dec. 20, 1978

[30] Foreign Application Priority Data

Dec. 22, 1977 [FR] France ................................ 77 39248

[51] Int. Cl.$^3$ ................................................ B29F 3/10

[52] U.S. Cl. ................................ 264/171; 425/131.5; 428/373

[58] Field of Search ................ 264/171, 168; 425/198, 425/131.5, 382.2, 463

[56] References Cited

U.S. PATENT DOCUMENTS

| | | | |
|---|---|---|---|
| 3,420,267 | 1/1969 | Veazey | 425/198 |
| 3,559,237 | 2/1971 | Biggelaar et al. | 425/198 |
| 3,577,308 | 5/1971 | Drunen et al. | 425/198 |
| 3,608,148 | 9/1971 | Sluijter | 425/198 |
| 3,701,619 | 10/1972 | Appeldoorn et al. | 425/198 |
| 3,800,985 | 4/1974 | Grout et al. | 264/171 |
| 3,801,429 | 4/1974 | Schrenk et al. | 264/171 |
| 3,950,476 | 4/1976 | Fontija | 264/171 |
| 3,968,307 | 7/1976 | Matsui et al. | 264/171 |
| 4,035,441 | 7/1977 | Endo et al. | 264/171 |

FOREIGN PATENT DOCUMENTS

| | | | |
|---|---|---|---|
| 49-117749 | 11/1974 | Japan | 264/171 |
| 51-70322 | 6/1976 | Japan | 264/171 |
| 6512919 | 9/1966 | Netherlands | 264/171 |

OTHER PUBLICATIONS 428 373;374

*Primary Examiner*—Jay H. Woo

*Attorney, Agent, or Firm*—Murray and Whisenhunt

[57] ABSTRACT

The present invention relates to a process and a device for the production of bi-component yarns containing bilaminar and multilaminar filaments.

Two polymer compositions are spun after feeding through a dichotomic mixer possessing tubes of identical internal diameter (5 to 25 mm), inside which 4 to 9 helical elements are placed in series, the leading edge of each of the elements being placed at 90° relative to the trailing edge of the previous element. The process and device according to the invention can be used for all types of spinning, namely solution spinning, melt spinning, semi-melt spinning and the like. The yarns obtained contain only a minor proportion of monolaminar filaments.

8 Claims, 7 Drawing Figures

PROCESS FOR THE PRODUCTION OF BI-COMPONENT YARNS

Figure 1:
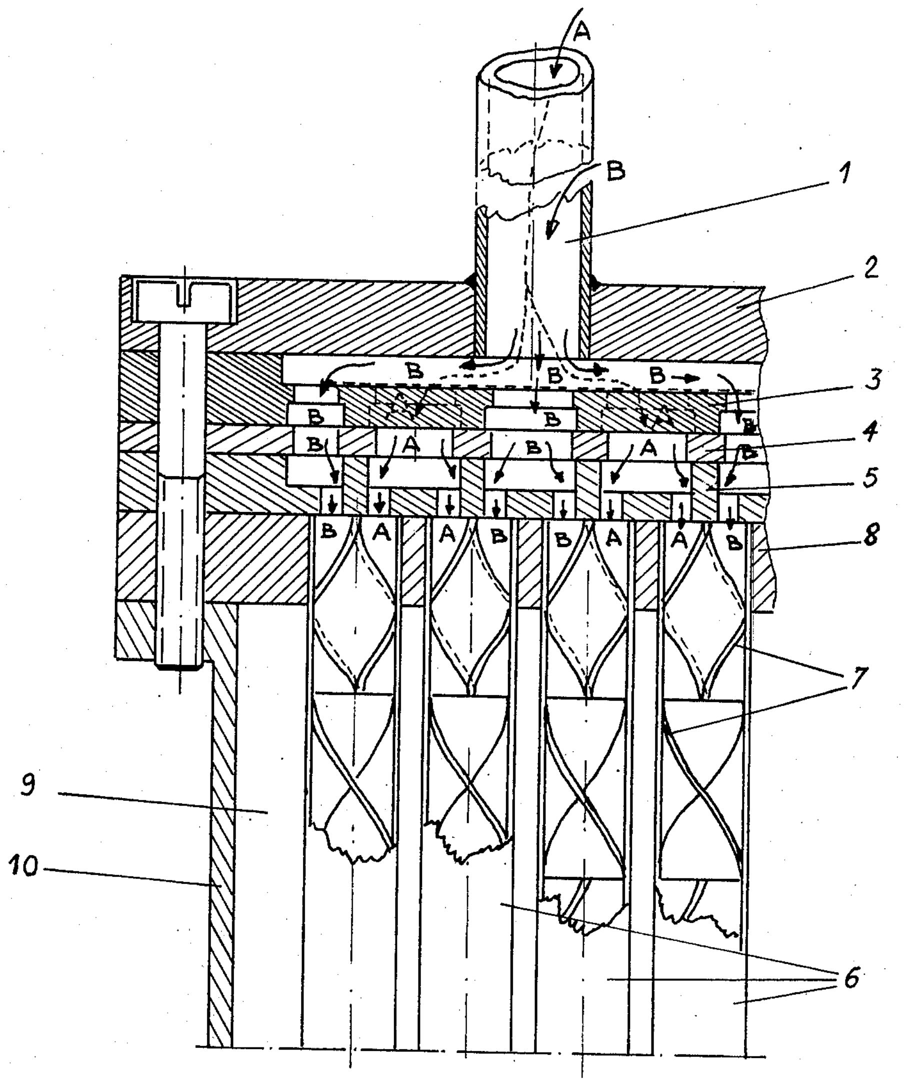

The present invention relates to a process for the production of bi-component yarns containing "bilaminar" (or "side by side") and "multilaminar" filaments. It also relates to a device for carrying out a spinning process of this kind.

The expression "bilaminar filament" is to be understood as meaning a continuous filament comprising two different components which have a surface of contact with one another and with the outside over substantially the whole length of the filaments. The expression "multilaminar filament" is to be understood as meaning a filament in which at least one of the components is present more than once in its cross-section of over substantially the whole of its length.

It is known to prepare bi-component yarns, which comprise only bilaminar filaments, by spinning polymer compositions with a systematic distribution of each composition at each spinning orifice, but the devices for carrying out processes of this kind are difficult to use on an industrial scale because they are technically too complicated and too expensive when there is a large number of orifices. It is already known, from French Pat. No. 1,359,880, to obtain bi-component yarns which comprise up to 50% of filaments of the bilaminar type, by spinning two polymer solutions distributed statistically, but, when industrial spinnerets possessing a large number of holes (at least 7,000 orifices) are to be used, the equipment becomes complicated, bulky, expensive and difficult to clean, particularly because of the large number of orifices in the spinneret.

It is also known, from Japanese Application 51/092,307, to use a static mixer consisting of at least 5 elements which are twisted by 180° so as to mix two molten polymers uniformly.

The present invention provides a process for the production of a bi-component yarn containing bilaminar and multilaminar filaments, which comprises feeding two compositions, each containing one of the components to be spun, separately to a dichotomic mixing system comprising a plurality of tubes which all have an identical internal diameter from 5 to 25 mm, and which all contain the same number from 4 to 9 of alternate left-hand and right-hand helical elements in series, the leading edge of each element being placed at 90° relative to the trailing edge of the previous element, the compositions being fed to opposite sides of the leading edge of the first element in each tube, and then spinning the two compositions mixed in this way through a spinneret containing a large number of orifices.

Preferably, the tubes constituting the mixer are identical to one another and are arranged parallel to one another and to the spinning axis.

The invention also provides a device for the production of the said bi-component yarns which comprises:

a dichotomic mixer consisting of tubes each of which has an identical internal diameter of between 5 and 25 mm, and preferably 7 to 14 mm, and contains the same number of alternate left-hand and right-hand helical elements, the leading edge of each element being positioned at 90° relative to the trailing edge of the previous element and the number of elements per tube being from 4 to 9 and preferably 5 to 8;

means for feeding each of the two compositions to the inlet of each tube of the said dichotomic mixer, on either side of the leading edge of the helical element placed upstream in the tube; and a spinneret placed downstream of the said mixer.

In certain cases, it is necessary or desirable to have a device for connecting the tubes to the spinneret, and also a heat insulation chamber placed around the tubes forming the mixer.

In the present invention, it is possible to use any pair of polymers or compositions which can be spun under the same spinning conditions, and preferably conditions generally used for the production of bi-component yarns capable of possessing a natural crimp. In general, if it is desired to create a suitable crimp, the two components must be chosen so that there is a certain difference in shrinkage between them, for example of at least 1% and preferably at least 5% or even more, after development of the crimp.

Examples of pairs which may be mentioned are those which differ from one another in the nature of the polymers, such as: homopolyamides and copolyamides, it being possible for one of the components to be, for example, polyhexamethylenediamine adipate or polycaprolactam, whilst the other is a copolyamide resulting from the polycondensation of several diacids and/or diamines or lactams; different polyesters: on the one hand, polyethylene terephthalate, and, on the other hand, polybutylene terephthalate, or two similar or different polyesters, one or both of which have undergone chemical modification, for example crosslinking; polymers, based on acrylonitrile, which differ from one another in the nature and the amount of the comonomers, other than acrylonitrile, which are present in their composition, or in their acid or base content in milliequivalents; cellulose polymers; and components of a completely different nature, such as a cellulose polymer and a completely synthetic polymer, or a polyester as one component and a polyamide as the other. The components can also be identical in nature but possess differences in physical properties such as viscosity, or degree of polymerisation.

It has been found that, surprisingly, the process and the device of the present invention are suitable for the preparation of bi-component yarns by making it possible to produce not homogeneous mixtures, as envisaged in Japanese Application No. 51/092,307, but, on the contrary, under certain conditions, a division of the flow of the two compositions into fine, uniform laminae, the said laminae being clearly separated from one another without mutual mixing. Unexpectedly, these laminae are suitable for the production of bi-component yarns essentially consisting of bilaminar or mutilaminar filaments. The orifices in the spinneret which receive both polymer compositions simultaneously are statistically distributed and their proportion can be as high as about 90% or even higher; the proportion of orifices which are fed by both compositions and give rise to bilaminar filaments is generally of about 60%. The conditions for the production of bi-component yarns are the size of the tubes, the internal diameter of which varies between 5 and 25 mm and preferably between 7 and 14 mm, and the number of helical elements (4 to 9 and preferably 5 to 8) placed inside each of the said tubes. The number of tubes used can vary within wide limits as a function of the size and shape of the spinneret used; for industrial-size spinnerets, it is possible to use a large number of tubes without greatly increasing the length of the spinning head and without increasing its diameter. The number of orifices in the spinneret must be substantially larger than the number of tubes. For example, the number of tubes may be at least 3 while the number of orifices is at least 2000.

The actual device for carrying out the process according to the present invention may comprise a feed pipe for each composition and distributing elements, such as plates (for example 3 or 4 in number), for conveying each of the two compositions to the inlet of each of the tubes, so that the compositions arrive on opposite sides of the leading edge of each helical element placed upstream in the tube. The helical elements are manufactured from rectangles, the width of which is equal to the internal diameter of the tubes into which they must be introduced. Each helix is formed by twisting one edge by 120° to 180°, relative to the other, and right-hand and left-hand helices are then mounted alternately in the tube in series, the leading edge of one helix being placed at 90° to the trailing edge of the previous helix.

In the case where distributing plates are used, they are stacked on top of one another in a leaktight manner, the leaktightness being produced, for example, by means of inserted seals or by direct contact between perfectly plane and machined faces having a very fine surface finish (obtained by grinding).

The tubes constituting the dichotomic mixer can be placed in any desired arrangement, for example in a convergent or divergent bundle; however, because it is easier, they are preferably arranged parallel to one another and to the spinning axis.

The arrangement of the downstream ends of the tubes can also vary, inter alia, as a function of the shape and size of the spinneret. In particular, the ends can be arranged in concentric circles in the case of round spinnerets, the number of circles depending on the size of the spinneret, or arranged in aline, it being possible for each line to be staggered relative to the adjacent line, in order to create a smaller bulk and a better distribution of the compositions to be spun; the downstream ends of the said tubes can also be arranged in an annular manner. Regardless of the method of assembly and the arrangement of the tubes, the leading edges of the upstream helical elements of each of the tubes forming the mixer must be suitably orientated so as to allow a satisfactory separate feed, into each tube, of the two compositions. Because it is easy to carry out, the leading edge of the blade constituting the upstream helical element of each of the tubes is preferably orientated in line along the line joining the centres of the upstream end of each of the tubes, in the linear arrangement, and along the tangent of the circle joining these same centres, in the case of a circular assembly.

The tubes constituting the mixer can be assembled by means of two assembly pieces which are fixed to the ends of the various tubes by brazing, welding, sticking, mechanical assembly or any other system. In certain cases, the assembly pieces can be fixed to an outer leaktight wall which encloses the unit and thus produces a heat insulation chamber. The outer wall itself can be made of an insulating material. The space between the outer wall, the two assembly pieces and the dividing elements can be filled with an insulating material in order to avoid exchange of heat between the spinning compositions and the medium for solidifying the filaments, for example in certain wet-spinning devices when there are substantial temperature differences between the compositions to be spun and the coagulating bath.

The flow of the compositions, which is divided into laminae near the spinneret, can be transferred by means of an assembly chamber which makes it possible to feed any type of spinneret, namely large spinnerets of the conventional type, round, annular, elliptical, square or rectangular spinnerets, or spinnerets consisting of an assembly of several small unit spinnerets as described in French Application 77/18,438, filed on 13.06.77 by the Applicant Company for a "spinneret". In the case of spinnerets consisting of an assembly of several unit spinnerets, it is possible to use a device with direct distribution into each unit spinneret, which device exhibits the advantage that it does not cause any deformation of the flow leaving the tubes. The device can be joined directly to each spinneret, in the case where the size of the dividing elements corresponds to that of the unit spinnerets, or it can be joined to a conical connecting piece, in the case where an adaptation is required.

Furthermore, a device of this kind is suitable for all spinning processes, namely melt spinning, semimelt spinning, solution spinning and the like.

The manner in which the process is carried out and the operation of the equipment will be understood more clearly with the aid of the accompanying drawings, in which:

FIG. 1 is a partial diagram of an embodiment comprising two pipes for feeding the compositions A and B, only one pipe being shown by 1, and distributing pieces 2, 3, 4 and 5 which convey and divide the flows of the polymer compositions in order to bring them to the inlet of each of the tubes 6 which are all identical to one another and comprise the helical elements 7 for static division. The distributing pieces 2, 3, 4 and 5 are held integral with one another and integral with an assembly piece 8, on which the tubes containing the helical elements are fixed. The tubes 6 are surrounded by a heat insulation chamber 9 which is closed by a leaktight wall 10.

Figure 2:
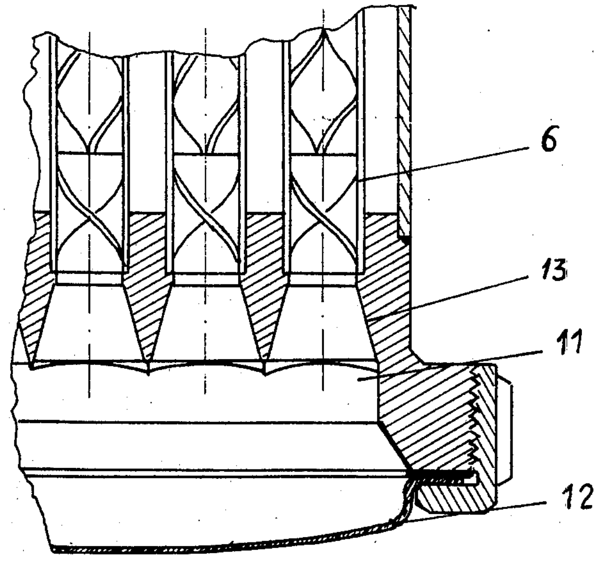

FIG. 2 shows a partial diagram of an embodiment of the device according to the present invention, comprising tubes 6 constituting the static mixer, an assembly chamber 11 joined directly to the spinneret 12, and connecting cones 13 joining the lower end of each tube 6 to the assembly chamber 11.

Figure 3:
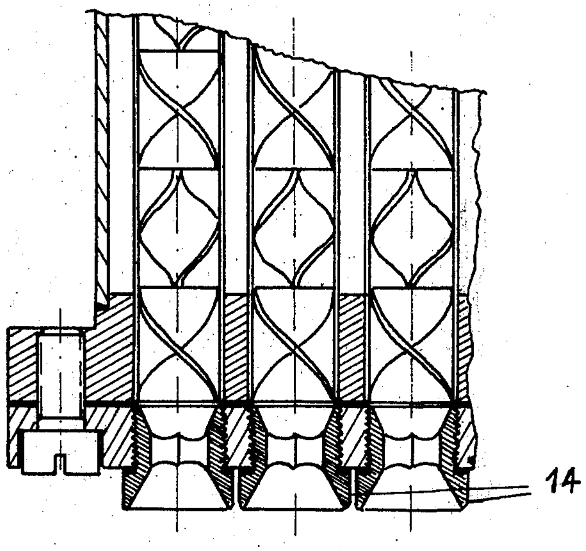

FIG. 3 shows another embodiment of the device according to the invention, with direct distribution of the two compositions from each tube to independent unit spinnerets 14.

Figure 4:
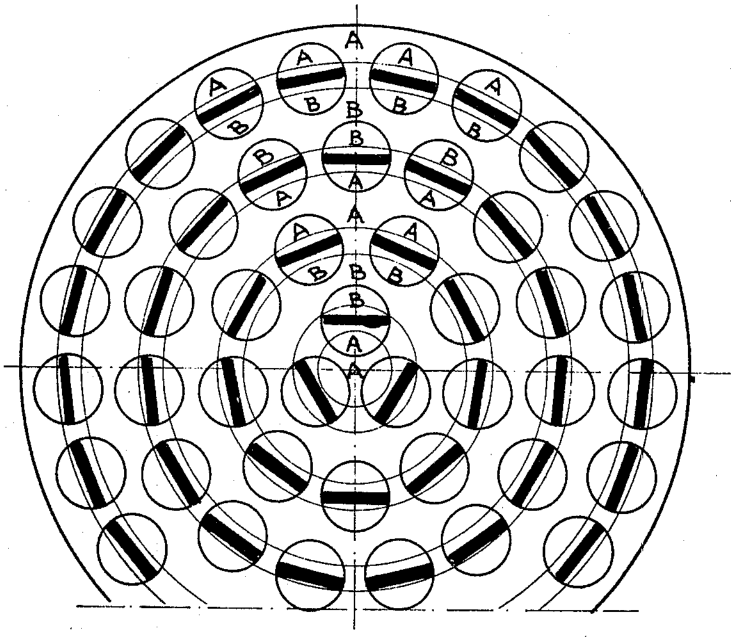
Figure 6:
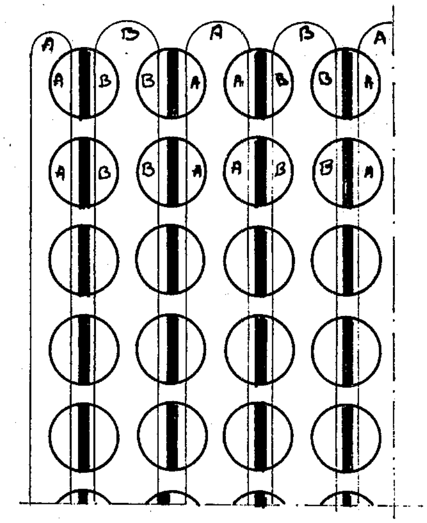

FIGS. 4 and 6 respectively illustrate a circular method of arrangement of the tubes constituting the mixer, and a linear method of assembly of the said tubes, in which figures the orientation of the leading edge of the blade constituting the upstream element of each of the tubes, and the alternate distribution of the two compositions A and B, are noted.

Figure 5:
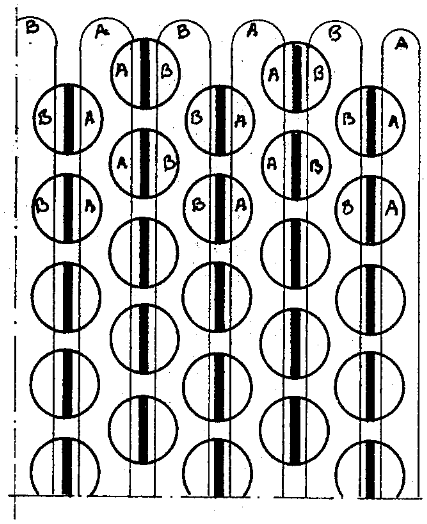

FIG. 5 also shows a linear method of assembling the tubes 6, but with a staggered distribution which allows a higher density of tubes.

Figure 7:
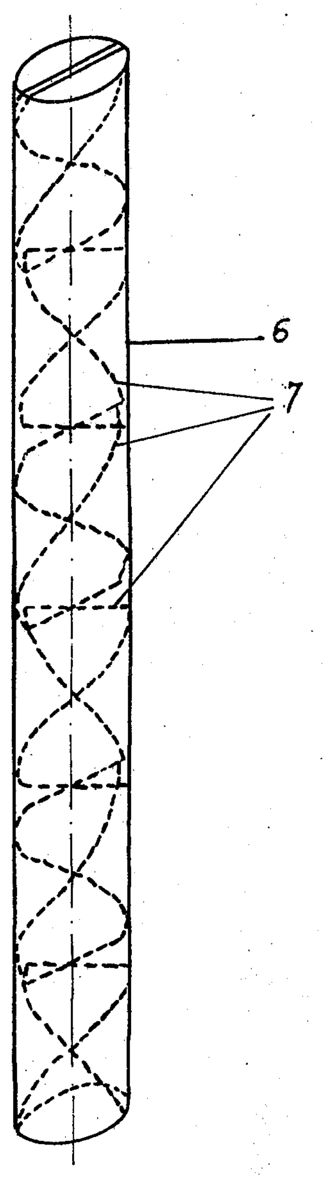

FIG. 7 shows an individual tube 6, inside which helical elements 7 are shown.

The process and the device according to the present invention are of great practical and economic value; in certain cases, the number of breaks in the yarns during spinning is very greatly reduced, compared with a spinning process using a conventional device for the production of single-component yarns, and this constitutes a totally unexpected result. A device of this kind can be adapted to any type and any shape of spinneret, namely spinnerets of circular, square, rectangular, triangular or annular shape, or a multispinnerets assembly.

A device of this kind possesses the additional advantage that it is of small bulk; lengthwise, the bulk of the device is approximately equal to that of the tubes and, transversely, it is easily less than that of the spinneret. Furthermore, it is easy to add tubes when it is desired to increase the surface area of the spinneret, and a device of this kind is very simple to produce, even on an industrial scale.

The following Example, in which the parts and percentages are expressed by weight, illustrates the invention.

EXAMPLE

A 21% solution in dimethylformamide of a polymer consisting of:

| | | |
|---|---|---|
| | acrylonitrile | 99.2% |
| | sodium methallylsulphonate | 0.8% |
| with: | milliequivalents of acid/kg of polymer | 83 |
| and | specific viscosity of (measured on a solution containing 0.2% of polymer in dimethylformamide at 20° C.), | 0.300 |

and a 24.3% solution in dimethylformamide, containing 5% by weight of water (relative to the polymer), of a polymer consisting of:

| | | |
|---|---|---|
| | acrylonitrile | 97.5% |
| | methyl methacrylate | 1.7% |
| | sodium methallylsulphonate | 0.8% |
| with: | milliequivalents of acid/kg of polymer | 82 |
| | specific viscosity | 0.325 |

are prepared. The two solutions are passed simultaneously into different mixing systems, namely on the one hand, mixing systems, according to the invention, with 7 identical tubes which are parallel to one another and to the spinning axis and each comprising 6 helical elements (experiment A) or 7 helical elements (experiment B), and, on the other hand, by way of comparison, mixing systems comprising 1 tube and 6 helical elements (experiment C) or 7 helical elements (experiment D). In all cases, the tube or tubes have a diameter of 11.3 mm, and a length of 114 mm in the case of 6 elements, or a length of 133 mm in the case of 7 elements. In all cases, each element has a length of 19 mm and a width of 11.3 mm. and a twist of 180°, the seven tubes are arranged in a circle of six tubes surrounding one tube in the middle with the upstream element of the tubes being oriented as in FIG. 4.

The two solutions, kept at a temperature of 65° C., are spun through a round spinneret, possessing 15,000 orifices each of 0.055 mm diameter, into a coagulating bath, kept at 20° C., which contains 57% of dimethylformamide and 43% of water. The filaments are then stretched in air in a ratio of 2.2×, washed in countercurrent at ordinary temperature and then re-stretched in boiling water in a ratio of 3.47×, after relaxation in boiling water by 20%; they are then dried under tension at a mean temperature of 90° C.

The filaments obtained, which have a gauge per filament of 3.3 dtex, consist of "bilaminar", "monolaminar" and "multilaminar" filaments which were counted; the results of the counting are given in the following table:

| | "bilaminar" % | "monolaminar" % | multilaminar" % |
|---|---|---|---|
| A | 48 | 26 | 26 |
| B | 42 | 17 | 41 |
| C | 23 | 58 | 19 |
| D | 24 | 40 | 36 |

A comparison of the results of these experiments shows that, in experiments A and B, the yarns possess a larger number of filaments which are truly "bilaminar" than the yarns obtained with a single tube and the same number of elements in accordance with experiments C and D; on the other hand, the number of "monolaminar" filaments is very small in experiments A and B, compared with experiments C and D.

What is claimed is:

1. In a process for producing bicomponent filamentary yarns comprising mixing two compositions, each containing one of the components to be spun, in a dichotomic mixing system comprising a tube containing alternate left-hand and right-hand helical elements in series, the leading edge of each element being placed at 90° relative to the trailing edge of the previous element, to form a mixed two component composition and spinning the mixed two component composition through a spinneret containing orifices, the improvement comprising:
   (a) mixing the compositions in said dichotomic mixing system comprising at least three tubes arranged in parallel, each tube having an identical internal diameter of from 5 to 25 mm, and containing the same number from 4 to 9 of said helical elements in series,
   (b) feeding each of said compositions to opposite sides of the leading edge of the first element in each tube,
   (c) transferring all streams of said mixed two component composition passing through all tubes to said spinneret by an assembly chamber wherein the streams from different tubes contact each other prior to spinning, and
   (d) spinning the mixed two composition passing through said assembly chamber through a spinneret containing at least 2000 orifices to form a yarn consisting essentially of bilaminar and multilaminar filaments.

2. Process according to claim 1, wherein each tube has an internal diameter of from 7 to 14 mm. and said polymers have a shrinkage difference therebetween of at least 1% so that said bicomponent filaments are capable of natural crimp development.

3. Process according to claim 1, wherein each tube contains from 5 to 8 helical elements.

4. Process according to claim 1, wherein each helical element causes the compositions to rotate through an angle of 120° to 180°.

5. Process for the production of a bicomponent yarn containing bilaminar and multilaminar filaments which comprises:
   (a) feeding two compositions, each containing one of the components to be spun, separately to a dichotomic mixing system,
   (b) said dichotomic mixing system comprising a plurality of tubes which all have an identical internal diameter from 5 to 25 mm, and which all contain the same number from 4 to 9 of alternate left-hand and right-hand helical elements in series, the tubes being arranged in parallel, the leading edge of each element being placed at 90° relative to the trailing edge of the previous element, (c) the compositions being fed to opposite sides of the leading edge of the first element in each tube, (d) passing the two compositions mixed in this way in said plurality of tubes to a single assembly chamber, and then (e) spinning the two compositions passing through the assembly chamber through a spinneret containing at least 2000 orifices to form said filaments.

6. Process for spinning two different filament-forming polymers to form bicomponent yarns consisting essentially of bilaminar and multilaminar filaments, said process comprising (1) passing said polymers through a dichotomic mixing system (2) to an assembly chamber and then (3) to a spinneret and (4) spinning said polymers through said spinneret to form said bilaminar and multilaminar filaments and a minor proportion of monolaminar filaments, wherein (A) the polymers are distributed to said spinneret with statistical distribution by said dichotomic mixing system, (B) said dichotomic mixing system comprising at least three tubes of identical internal diameter of about 5 to about 25 mm. containing the same number of alternate left-hand and right-hand helical elements in series, the leading edge of each element being placed at 90° relative to the trailing edge of the previous upstream element, the number of elements per tube being about 4 to about 9, (C) said polymers being fed to opposite sides of the leading edge of the first element in each tube and passing through said tubes to undergo said dichotomic mixing (D) the polymers passing through a given tube being transferred by an assembly chamber to a spinneret wherein the polymers are spun through at least 2000 orifices to form said bicomponent yarn.

7. Process of claim 1, wherein the cross-sectional area of said tubes corresponds approximately to the surface of said spinneret.

8. In a process for producing bicomponent filamentary yarns comprising mixing two compositions, each containing one of the components to be spun, in a dichotomic mixing system comprising a tube containing alternate left-hand and right-hand helical elements in series, the leading edge of each element being placed at 90° relative to the trailing edge of the previous element, to form a mixed two component composition and spinning the mixed two component composition through a spinneret containing orifices, the improvement comprising:

(a) mixing the compositions in said dichotomic mixing system comprising at least three tubes arranged in parallel, each tube having an identical internal diameter of from 5 to 25 mm, and containing the same number from 4 to 9 of said helical elements in series, while passing the compositions through said tubes in a direction which is towards said spinneret, (b) feeding each of said compositions to opposite sides of the leading edge of the first element in each tube, (c) transferring all streams of said mixed two component composition passing through all tubes to said spinneret by an assembly chamber wherein the streams from different tubes contact each other prior to spinning, and (d) spinning the mixed two component composition passing through said assembly chamber through a spinnert containing at least 2,000 orifices to form a yarn consisting essentially of bilaminar and multilaminar filaments.

* * * * *